Dec. 28, 1943. D. E. ANDERSON 2,337,959
AIR CHAMBER FOR WATER SERVICE LINES
Filed Sept. 19, 1941
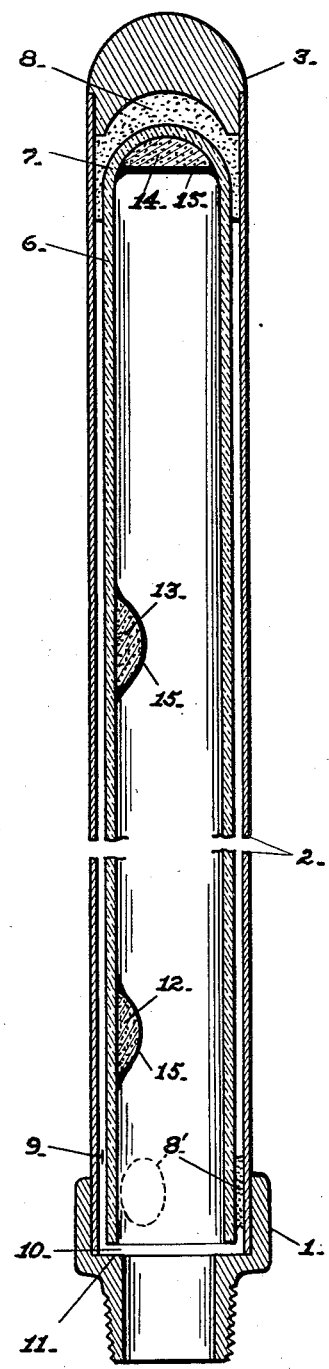
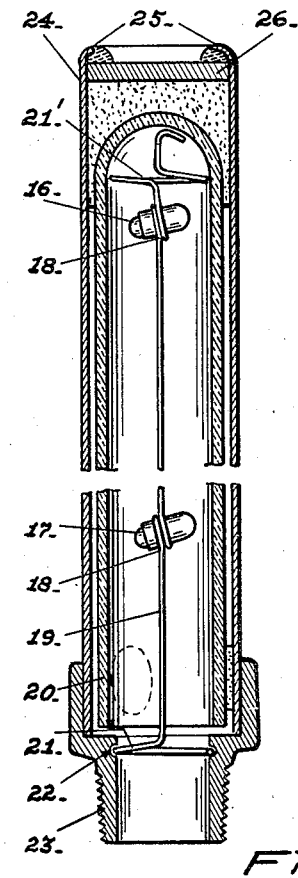
Fig_2_
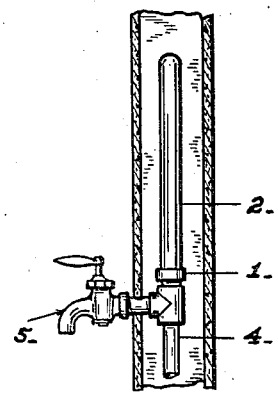
Fig_3_
INVENTOR
David E. Anderson
Fig_1_

Patented Dec. 28, 1943

2,337,959

UNITED STATES PATENT OFFICE 2,337,959

AIR CHAMBER FOR WATER SERVICE LINES

David E. Anderson, Los Angeles, Calif.

Application September 19, 1941, Serial No. 411,527

5 Claims. (Cl. 138—26)

My invention relates to air chambers as used in connection with the outlets in water service lines in dwellings and other buildings for the purpose of air-cushioning water pressure shocks and eliminating objectional hammering in such lines.

In consideration of the above noted objection it is the primary object of the present invention to provide a new form of air chamber in which a glass tube or the like enclosed by a metal shell eliminates air leakage in that the air compressed in the glass tube will not leak through the walls thereof.

Another object of my invention is to provide an air chamber of the character described which is simple and inexpensive as to construction and capable of reliable performance over long periods of time without necessitating replacement.

A further object of my invention is to provide an air chamber for the purpose described in which a water responsive gas producing agent such as calcium carbide or metallic sodium, is arranged in the chamber in such manner as to automatically produce a gas to replace or replenish the "air" which may have leaked out over an extremely long period of time.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

In the drawing:

Figure 1 is a vertical sectional view of an air chamber embodying my invention.

Figure 2 is a fragmentary vertical sectional view of a modified form of the invention.

Figure 3 is a fragmentary view in side elevation and in section showing a typical use and installation of the air chamber embodying my invention.

Referring to the drawing more specifically and in particular to Figure 1 the air chamber there shown comprises a tubular attaching fitting 1 into one end of which is press fitted and sweated or otherwise fixed, the open lower end of a cylindrical metal shell or tube 2 closed and sealed at its upper end by means of a suitable plug or closure member 3. The other end of the fitting 1 is screw-threaded whereby it may be connected as shown in Figure 3 with a water service line 4 adjacent the faucet outlet 5 as is the established practice.

Within and circumferentially spaced from the metal shell 2 is a tube 6 of glass or any other material which is similarly impervious to gas leakage, open at its lower end and having a hermetically sealed closure or wall 7 at its upper end. This end 7 is embedded in cement or other suitable adhesive 8 contained at the closed end of the shell and at spaced portions 8' at the lower end thereof to hold the glass tube in place in the shell 2. In the one form illustrated; the mounting of the tube 6 in the shell 2 defines an annular chamber or space 9 between the cylindrical walls of the tube and shell. This annular space opens as at 10 into the bore of the fitting 1, and as the lower end of the glass tube is spaced upwardly from the corresponding end of the metal shell and the shoulder 11 on the fitting 1, air or air and water may freely flow into the annular space 9 whereupon all pressures to which the chamber is subjected are equalized within and without the tube. By this arrangement, as the chambers in general use for this purpose are of small bore, the use of a correspondingly thin glass tube wall provides a more effective air volume space and more efficient air cushioning action.

It is now apparent that with the chamber of my invention installed as shown in Figure 3, as soon as the water is turned into the service line 4 the air in the line and chamber will be trapped in the glass tube 6 and also in the annular space 9 between said tube and the metal shell and there compressed as a cushion to prevent "hammering" and shocks due to sudden pressure variation. The glass tube will retain the air therein due to the density of the glass. The air pressure in the space 9 equalizes the pressure on the glass tube to protect the latter. If the air leaks out of the space 9 through the pores of the metal shell the water will rise into said space proportionately and thus maintain the desired equalizing pressure to protect the glass chamber.

If desired a water responsive agent for generating gas such as calcium carbide or metallic sodium may be so positioned and retained in the glass tube that, should the water level therein rise to the level of the gas producing agent due to increased water pressure or loss of air from the glass tube over extremely long periods of time, gas will be automatically generated to augment or replace the "air" cushion in the chamber.

As shown in Figure 1 I may place at suitable successive internal positions on the sides and at the upper end of the glass tube suitable quantities 12, 13 and 14 of water responsive gas generating material. These quantities may be held in place by a water soluble adhesive or other material, indicated at 15 by the black line, which is dissolved or disintegrated by direct contact action of the water content of the chamber. The properties of the material 15 are such as to provide for dissolution and regeneration of gas only at such times as the water level in the tube reaches such height therein, due to loss of air therefrom, that said material is dissolved or disintegrated, thereby releasing the gas forming agent into the water present in the tube to again refill the chamber with gas and re-effect efficient action of the device as an "air" cushion. Disposition of these gas regenerators at spaced intervals in the tube provides for automatic gas recharging of the device, periodically occurring, when and as the water level reaches the successive stations or levels of the gas generators thereby effecting definitely prolonged efficient service.

As shown in Figure 2 I may support capsules or the like designated 16 and 17 in loops 18 of a wire or rod 19 extending into the glass tube 20 to maintain the gas generating agent at spaced intervals in the chamber. This wire or rod 19 is formed with the horizontal coils 21 and 21' the former engaged in a groove 22 in the fitting 23 and the latter disposed within the glass tube to hold the wire and capsules in place. The capsules 16 and 17 may be made of the same materials above described. The metal shell 24 is crimped over as at 25 against and welded to a sealing disk 26 to seal the upper end of the shell 24.

It is now apparent that I have provided a new and automatically efficient type of air chamber which will prevent hammering and pressure shock in water service lines in a most reliable manner over longer period of time than heretofore possible.

I claim:

1. In an air chamber for water service lines, a tubular shell closed at its upper end and open at its lower end, a tubular fitting for attaching the chamber to a water service line and to which the lower end of the shell is fixed, a glass tube mounted in said shell with its upper end closed and disposed adjacent the closed end of the shell and its lower open end registering with the bore through said fitting, and means for fixing said glass tube in said shell, a water responsive gas producing agent in said tube, and a water soluble coating for normally covering said agent.

2. In an air chamber for water service lines, a tubular shell closed at its upper end and open at its lower end, a tubular fitting for attaching the chamber to a water service line and to which the lower end of the shell is fixed, a glass tube mounted in said shell with its upper end closed and disposed adjacent the closed end of the shell and its lower open end registering with the bore through said fitting, and means for fixing said glass tube in said shell, a water responsive gas producing agent in said tube, and a water soluble coating for normally covering said agent and holding it at a predetermined level in said tube.

3. In an air chamber, a closed end tubular shell having a tubular fitting at its other end for attaching the chamber to a water service line, a glass tube closed at its upper end and disposed within said shell, a water responsive gas producing agent in said tube and a water soluble coating for normally covering said agent.

4. In an air chamber, an air chamber shell, a glass tube in said shell, a water responsive gas producing agent in said tube and a water soluble coating for normally covering said agent.

5. In an air chamber, an air chamber shell, a glass tube in said shell, a water responsive gas producing agent disposed at spaced intervals in said tube, and a water soluble coating for normally covering said agent.

DAVID E. ANDERSON.